April 8, 1952     C. T. WALLIS     2,591,895

SHAFT GAUGE

Filed Aug. 31, 1949

Inventor
Cyril T. Wallis
By Willits, Helmig & Baillio
Attorneys

Patented Apr. 8, 1952

2,591,895

UNITED STATES PATENT OFFICE 2,591,895

SHAFT GAUGE

Cyril T. Wallis, Brockport, N. Y., assignor to General Motors Corporation, Detroit, Mich., a corporation of Delaware Application August 31, 1949, Serial No. 113,364

1 Claim. (Cl. 33—178)

This invention relates to a gauge construction which is particularly adapted for measuring or checking the diameter of relatively small shafts.

The principal object of the invention is to provide a simple gauge of extreme accuracy which can, however, be readily constructed of parts that require only such manufacturing tolerances as can be easily maintained during fabrication.

The above together with other objects and the advantages of the present invention will be apparent from or specifically noted in the following description of the embodiment shown in the accompanying drawing.

The present gauge consists essentially of three rollers or cylinders which are preferably of equal diameters and held or clamped together so that they touch each other to form an opening having three inwardly curved sides within which the shaft or other article to be gauged is to be inserted. As will be noted hereinafter, the diameter of a circle inscribed in this opening and touching all three sides is a function of the outside diameters of the gauge cylinders.

Figure 1:
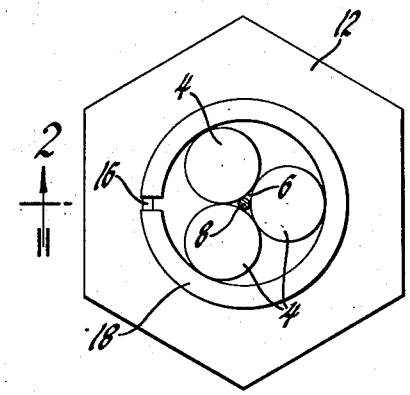
Fig. 1 is an end view of the present gauge with a shaft to be gauged shown in cross section.
Figure 2:
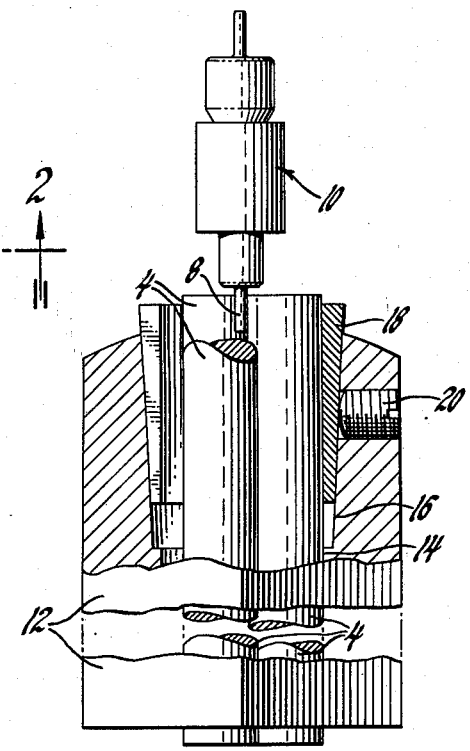
Fig. 2 is a side view of the gauge with parts broken away and in section substantially on line 2—2 of Fig. 1 showing an article having a shaft to be gauged in elevation.

Referring first to Figs. 1 and 2, the three cylinders 4 are shown in contact with each other to provide the opening 6 to receive any relatively small round article to be gauged, such as a shaft 8. By way of example, the article to be gauged is shown in Fig. 2 as a clock balance wheel staff indicated generally at 10 having the shaft portion 8.

The gauge cylinders 4 may be held or clamped together in any suitable manner. In the present embodiment the gauge body consists of a hexagonal rod 12 having an axial bore 14 to loosely receive the cylinder 4. The bore 14 is enlarged and formed with a tapered socket 16 at its upper end to receive a split tapered clamping ring or collar 18 which may be forced into the tapered socket around the cylinders and secured by set screw 20 to clamp and maintain the cylinders 4 in perfect contact with each other.

With this gauge construction the cylinders 4 can be rotatably adjusted as they wear to present new surfaces for engagement by the articles to be gauged, and the cylinders are also of such length that they can be axially adjusted in the gauge body and the used or worn end portions ground off or otherwise removed.

In using the present gauge it has been heretofore noted that the shaft or similar round article is adapted to be inserted within the gauge opening 6. Since this opening is formed or constituted by the inwardly curved sides of the cylinders 4, it will be seen that there are three points of contact on the shaft being gauged and any shaft which is not truly round can thus be readily detected.

It will be apparent that this gauge is of simple construction and that the only dimensions which are at all critical to insure extreme accuracy are the respective diameters of the three cylinders 4. These cylinders are preferably of equal diameters and a formula or equation can be readily developed to determine the proper cylinder diameter for gauging shafts of any given diameter.

Figure 3:
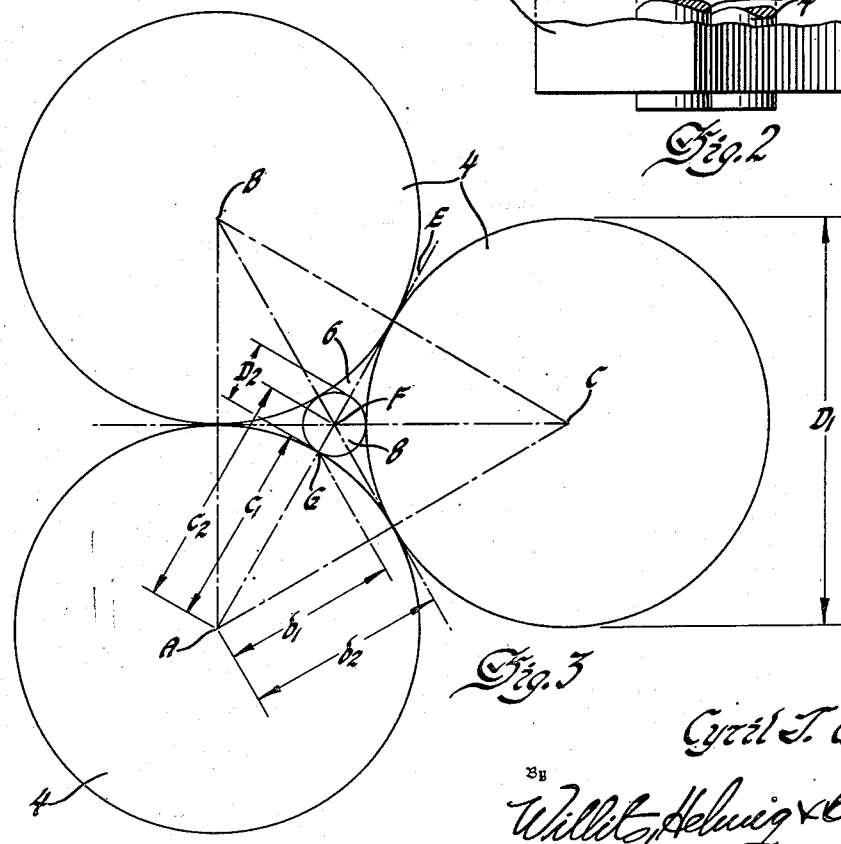
Fig. 3 is a diagram used in the development of an equation to predetermine the constructional dimensions for gauges of various sizes.

In the diagram of Fig. 3, the gauge cylinders 4 having diameter $D_1$ are shown in contact with each other to form the opening 6 and the circle of the diameter $D_2$ which can be inscribed in this opening to touch all three cylinders is designated by numeral 8 since it corresponds to the shaft to be gauged by insertion within the opening 6 as heretofore described. The centers A, B and C of the respective cylinders are connected to form an equilateral triangle and a line AE is drawn to bisect the angle BAC of this triangle. It will be seen that the line AE passes through the center F of the circle 8 and through a point G at which this circle contacts the cylinder having the center A. Two similar right triangles are formed by dropping perpendiculars to the line AC from the center F and point G, respectively, and it will be noted that the triangle having base $b_1$ has a hypotenuse $c_1$ equal to the cylinder radius while the other triangle has a base $b_2$ equal to the cylinder radius and a hypotenuse $c_2$ equal to the cylinder radius plus the radius of circle 8.

Referring to this diagram the equation for determining the proper diameter for the gauge cylinders may be developed as follows:

Since the angles of the two right triangles which are constructed as indicated above are equal, their corresponding sides are proportional, so $$\frac{c_2}{b_2}=\frac{c_1}{b_1}$$

The side $$b_1 = c_1 \cos \text{angle } EAC = c_1 \cos 30° = c_1(.8660)$$

and substituting in the above equation, we have $$\frac{c_2}{b_2} = \frac{c_1}{c_1(.8660)} = \frac{1}{.8660}$$

so that $$c_2 = \frac{b_2}{.8660}$$

The diameter of the circle 8 or $D_2 = 2(c_2 - c_1)$ and since $c_1 = b_2$, we find by substitution that $$D_2 = 2\left(\frac{b_2}{.8660} - b_2\right) = 2b_2\left(\frac{1}{.8660} - 1\right) = 2b_2(.15473)$$

In this equation $$2b_2 = D_1 \text{ so } D_2 = D_1(.15473)$$

and the final equation for determining the diameter $D_1$ of the gauge cylinders is therefore $$D_1 = \frac{D_2}{.15473}$$

The foregoing equation has been developed not only to enable those skilled in the art to practice the invention but also to indicate the extreme accuracy that may be readily obtained in constructing the present gauge. It will be seen that the diameters of the gauge cylinders should be approximately six times the diameter of the inscribed circle or shaft to be gauged so that any deviation from the specified diameters of the three cylinders would only affect the diameter of this circle about one-sixth of such deviation and a deviation in diameter of only one cylinder would have even less effect. In actual practice the outside of the gauge cylinders can be easily ground to an accuracy of .0001 inch and the accuracy of the inscribed circle will therefore be approximately one-sixth of this figure, or .000015 inch.

In the illustration given above the three gauge cylinders have been assumed to be of equal diameters and, while this may be preferable from the standpoint of manufacture and assembly, it will be understood that this is not essential in the broader aspects of the invention. If, for instance, two of the cylinders be assumed to be of equal diameters, the third may be one of a series of interchangeable cylinders of varying diameters computed to give a desired range of gauge openings.

When three cylinders are held in contact with each other to form the gauge opening it will be apparent that the size of the gauge opening is in all instances a function of the diameters of the cylinders. Although only a specific embodiment has been shown and described herein, it will be understood that modifications and changes in the details of construction will be obvious to those skilled in the art and are contemplated as within the scope of the present invention as defined in the claim appended hereto.

I claim:

In a gauge for shafts or the like, a body, three parallel cylinders of substantially equal diameters mounted in said body, and clamping means between said body and cylinders to engage and force said cylinders into elemental line contact with each other to provide an opening of predetermined size between said cylinders to receive the shaft to be gauged.

CYRIL T. WALLIS.

REFERENCES CITED

The following references are of record in the file of this patent:

UNITED STATES PATENTS

| Number | Name | Date |
|---|---|---|
| 195,008 | Harvey | Sept. 11, 1877 |
| 2,362,907 | Levin | Nov. 14, 1944 |
| 2,392,317 | Eisele | Jan. 8, 1946 |